No. 614,275. Patented Nov. 15, 1898.
E. F. PORTER.
APPARATUS FOR HEATING AND AGITATING AIR.
(Application filed Dec. 27, 1897.)
(No Model.)
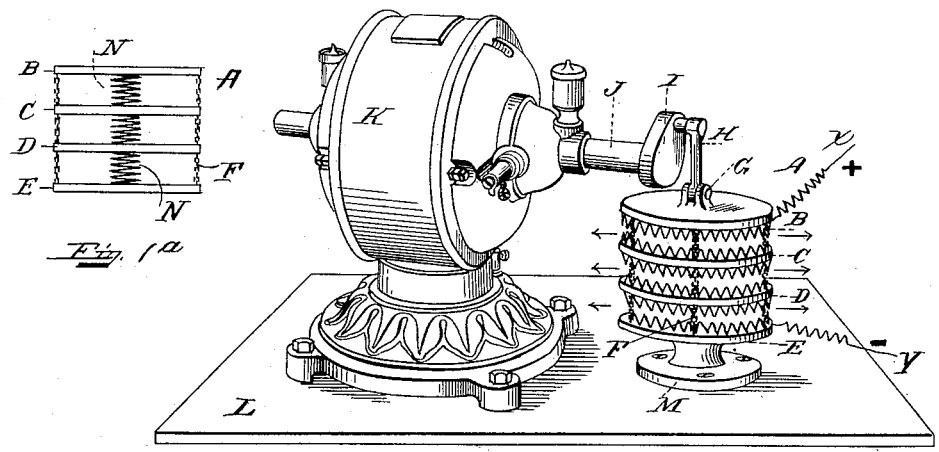
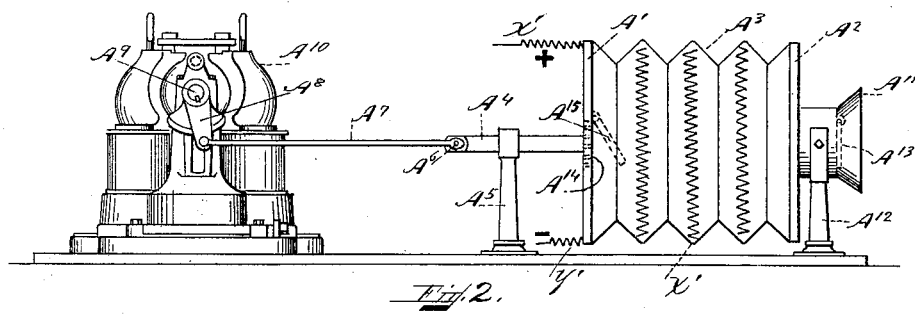
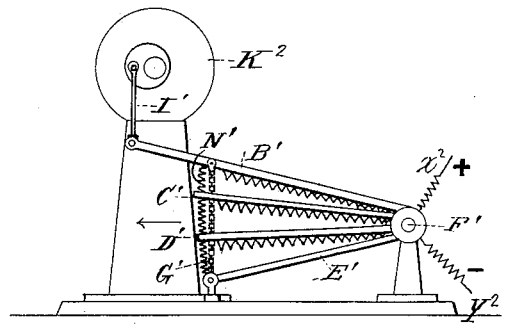
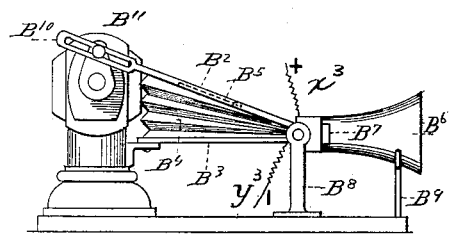
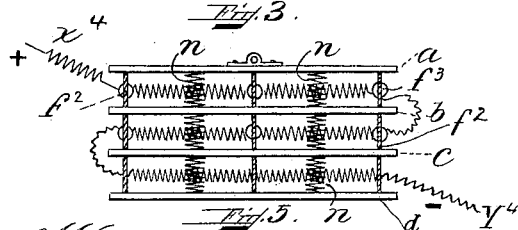
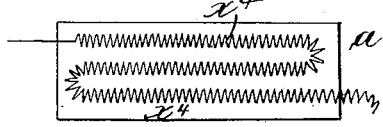

UNITED STATES PATENT OFFICE.

EDWIN F. PORTER, OF BOSTON, MASSACHUSETTS, ASSIGNOR TO THE BAY STATE ELECTRIC HEAT AND LIGHT COMPANY, OF JERSEY CITY, NEW JERSEY.

APPARATUS FOR HEATING AND AGITATING AIR.

SPECIFICATION forming part of Letters Patent No. 614,275, dated November 15, 1898.

Application filed December 27, 1897. Serial No. 663,514. (No model.)

*To all whom it may concern:*

Be it known that I, EDWIN F. PORTER, a subject of the Queen of Great Britain, residing at Boston, in the county of Suffolk and State of Massachusetts, have invented certain new and useful Improvements in Apparatus for Heating and Agitating Air, of which the following is a specification.

My invention relates to improvements in apparatus for heating and agitating air; and its object is to heat and afterward distribute a body of air throughout an apartment in which the apparatus is located.

For carrying out the above object I embody my invention in an apparatus consisting of a series of plates so arranged and operated that they may be moved to and fro to cause a circulation of air between said plates, and thereby produce an agitation of the air in the apartment, which air is successively drawn between and thrown from the plates, which in the apparatus shown and described are electrically heated.

My invention consists of certain novel features hereinafter described, and particularly pointed out in the claims.

In the accompanying drawings, which illustrate constructions in which my invention is embodied, Figure 1 is a perspective view of my improved heating and agitating apparatus and motor for operating the same. Fig. 1$^a$ is a detail view hereinafter described. Fig. 2 is a side view of a modified form of the apparatus shown in Fig. 1. Fig. 3 is a side view of a modified construction of the apparatus shown in Fig. 1. Fig. 4 is a side view of a modified construction of the apparatus shown in Fig. 3. Fig. 5 is a construction illustrating a modified arrangement of the heating-wires shown in Fig. 1. Fig. 6 is an under plan view of one of the plates shown in Fig. 5.

Like letters of reference refer to like parts throughout the several views.

Referring to Figs. 1 and 1$^a$, A represents a heating and agitating apparatus consisting of a series of plates B, C, D, and E, which are loosely connected together by means of a series of chains F, connected at several points on each plate near their peripheries. To the center of the upper plate B there is pivotally connected at G the lever H, adapted to be operated by the eccentric crank I, mounted on the shaft J, which is revolved by means of a suitable motor K, mounted fast on a suitable base L, to which also the base M of the heater and agitator A is secured. In the apparatus shown the plates are heated by means of the electrical conductor or resistance X, which is secured to the plates B, C, D, and E by suitable insulating-pins, and the electric current passes from the top plate to the bottom plate and out at Y. Between the plates, as shown in Fig. 1$^a$, there are arranged equalizing-springs N, which prevent the plates from contacting with each other as the lever H descends in the movement of the eccentric crank I, and by preventing the contacting of the plates no short-circuiting of the wires can take place. The action of these springs N is to draw the plates together, thereby maintaining an equal distance between them all in any position of the eccentric crank I. It is obvious that during the revolution of the motor as the upper plate of the agitator rises and falls the air is alternately drawn in and forced out from between the plates, which causes a general agitation or circulation of the air in the apartment, and the air during this agitation is heated by contact with the electrically-heated conductors.

Fig. 2 is a modified form of the apparatus shown in Fig. 1 and consists of two plates A' and A$^2$, which correspond with the plates B and E shown in Fig. 1. In this construction the plates D and E are omitted and a bellows connection A$^3$ is added between the plates A' and A$^2$ and an electrical conductor X' is carried on suitable insulating-supports with the bellows. To the center of the plate A' is secured a rod A$^4$, which slides in the support A$^5$, and to the free end A$^6$ of said rod there is pivotally connected the rod A$^7$, which is operated by the eccentric crank A$^8$, fast on the shaft A$^9$ of the electric motor A$^{10}$. To the front plate A$^2$ there is secured a spreading-nozzle A$^{11}$, which rests on the support A$^{12}$. The opening of said nozzle A$^{11}$ is controlled by a valve A$^{13}$, opening outward, and a series of small ports $A^{14}$ are provided in the plate $A'$, and said ports are controlled by the valve $A^{15}$, pivoted to the inside of the plate $A'$. In this apparatus, the object being to heat and agitate air, the air is drawn in through the ports $A^{14}$ as the bellows is expanded by the action of the motor, and as the bellows is compressed the air, which has been heated by the electrical conductor $X'$, is forced out from the spreading-nozzle $A^{11}$ by the opening of the valve $A^{13}$ and circulated in the apartment to be heated. The electric current passes through the electrical conductor $X'$, then through the wire located within the bellows, and out at $Y'$. In this construction the air is drawn into the bellows, heated, and may be directed to any desired point by the nozzle $A^{11}$.

Fig. 3 is a modified form of the construction shown in Fig. 1 and differs from it only in having the plates pivoted at one end and free to move at the other instead of remaining parallel with other. In this construction the plates $B'$, $C'$, $D'$, and $E'$ are pivotally connected to the shaft $F'$, and their outer ends are loosely connected by suitable chains $G'$. By means of a suitable motor $K^2$ the upper plate $B'$, through the connecting-rod $I'$, is caused to move downwardly, and with it the plates $C'$ and $D'$; but said plates are prevented from contacting with each other by the suitable equalizing-springs $N'$, located between said plates and similar in function to those described in Fig. $1^a$. The electrical heating-conductor $X^2$ is mounted on said plates by means of suitable insulating-pins, and the electric current passes through said conductor $X^2$ and out at $Y^2$. In this construction the operation is substantially the same as in the apparatus illustrated in Fig. 1, the air being drawn in between the plates, heated, and then forced out by the reverse action of the apparatus.

Fig. 4 is a modified construction of the device shown in Fig. 3. This apparatus is substantially the same as that shown in Fig. 3, with the addition only of a bellows connection. In this apparatus $B^2$ and $B^3$ represent the upper and lower plates, to which is secured the bellows connection $B^4$. In the upper plate $B^2$ there is located a valve $B^5$, which is adapted to open as the bellows opens to admit air, and the air in the opening and closing of the bellows is diffused from the nozzle $B^6$ throughout the apartment by the opening of the valve $B^7$, located in said nozzle, which is supported by the standards $B^8$ and $B^9$. The upper plate $B^2$ is raised and lowered by the rod $B^{10}$, which is actuated by the motor $B^{11}$. The electric current passes through the electric conductor $X^3$ and out from said electric conductor at $Y^3$, and by means of said conductor the air entering said bellows is heated and then blown from the nozzle by the closing of the bellows.

Figs. 5 and 6 represent modified constructions of the electrical conductor shown in Fig. 1 and differ from it only in having the wires located between the plates rather than mounted on them. In this construction $a$, $b$, $c$, and $d$ represent four plates adapted to be raised and lowered by suitable mechanism, as shown in Fig. $1^a$, and between the plates are arranged the equalizing-springs $n$, which are similar in function to those shown in Fig. $1^a$. The electrical conductor $X^4$ is supported by the insulating-rings $f^3$, placed upon the cords $f^2$ and held midway between the plates. The current passes from said electrical conductor, heats the plates between which it is located by rotation, and passes out at $Y^4$.

In all the forms of construction herein described and shown in the drawings it will be seen that the object is to heat a body of air by means of an electric current and to diffuse the same throughout the apartment or space to be heated.

I do not limit myself to the arrangement and construction shown, as the same may be varied without departing from the spirit of my invention.

Having thus ascertained the nature of my invention and set forth a construction embodying the same, what I claim as new, and desire to secure by Letters Patent of the United States, is—

1. In an apparatus of the character specified, a series of plates, means for heating said plates, and mechanism for operating one or more of said plates relatively to each other to agitate the surrounding air.

2. In an apparatus of the character specified, a series of plates, means for electrically heating said plates, mechanism for moving said plates relatively to each other to agitate the surrounding air.

3. In an apparatus of the character specified, a series of plates, means for electrically heating said plates, means for equalizing the distance between said plates, and mechanism for moving said plates relatively to each other to agitate the surrounding air.

4. In an apparatus of the character specified, a series of plates, means for electrically heating said plates, equalizing-springs between said plates, and mechanism for moving said plates relatively to each other to agitate the surrounding air.

5. In an apparatus of the character specified, a series of plates, a bellows connection between said plates, means for heating the air within said bellows, and mechanism for operating said bellows.

In testimony whereof I have signed my name to this specification, in the presence of two subscribing witnesses, this 23d day of December, A. D. 1897.

EDWIN F. PORTER.

Witnesses:
A. L. MESSER,
C. A. STEWART.